Sept. 24, 1963 R. GOUIRAND 3,104,679
MEANS FOR CONTROLLING PRESSURES IN PNEUMATIC SUSPENSION
CUSHIONS OF A TRACTOR-TRAILER COMBINATION
Filed April 7, 1960 2 Sheets-Sheet 1

INVENTOR
Rene Gouirand
BY
Cornelius Zabriskie
ATTORNEY

Sept. 24, 1963 R. GOUIRAND 3,104,679
MEANS FOR CONTROLLING PRESSURES IN PNEUMATIC SUSPENSION
CUSHIONS OF A TRACTOR-TRAILER COMBINATION
Filed April 7, 1960 2 Sheets-Sheet 2
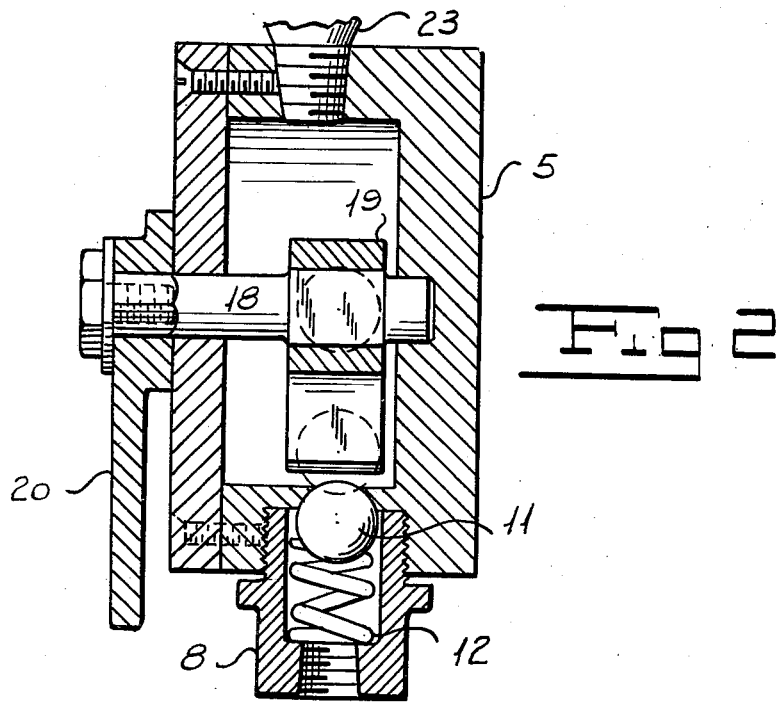
Fig 2
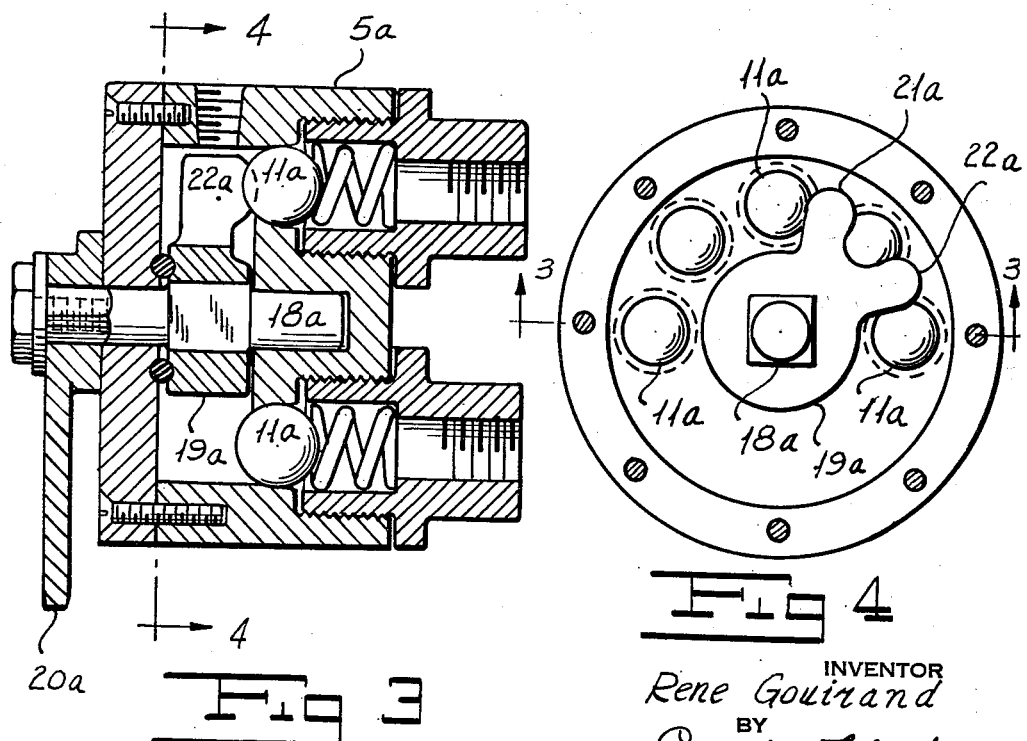
Fig 3
Fig 4
INVENTOR
Rene Gouirand
BY
Cornelius Zabrowkee
ATTORNEY

United States Patent Office 3,104,679
Patented Sept. 24, 1963

3,104,679
MEANS FOR CONTROLLING PRESSURES IN PNEUMATIC SUSPENSION CUSHIONS OF A TRACTOR-TRAILER COMBINATION
Rene Gouirand, 210 W. 88th St., New York, N.Y.
Filed Apr. 7, 1960, Ser. No. 20,604
2 Claims. (Cl. 137—625.2)

Tractor-trailer combinations may be so constituted that the tractor is provided with a pneumatic suspension above its rear axle, while the rear end of the trailer is supported by a pneumatic suspension above its rear axle.

The present invention is directed to means for controlling the pressures in these respective pneumatic suspensions according to the load as may be determined by the driver of the tractor. Thus a heavily loaded trailer will require greater pneumatic pressure within one or both of these pneumatic suspensions and, when traveling light, this pressure may be excessive and a lower pressure desirable.

According to the present invention the pneumatic cushions which form parts of the suspensions of the tractor and trailer are connected to a series of manually operable valves, all associated with a common valve housing. These several valves respectively control pressure feed and exhaust of the pressure within the respective cushions, there being a common compressed air feed to the housing from a tank preferably carried by the tractor. A manually operable valve actuator can be moved from an idle position at the will of the driver of the tractor into selected positions for operating any two valves simultaneously to admit or relieve pressure in the cushions selectively.

With the valve housing is associated an indicator and pressure relief valve, the function of which indicator is to show the number of pounds pressure contained in each pneumatic cushion and the corresponding loadings which such pressure is adapted to properly support, while the pressure relief valve serves as a safety measure against the building up of excessive pressure in the system.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

FIG. 2 is a section on the line 2—2 of FIG. 1.

FIG. 3 shows a modified form of control valve mechanism in central section, this section being taken in the plane of the line 3—3 of FIG. 4.

FIG. 4 is a section on the line 4—4 of FIG. 3.

Figure 1:
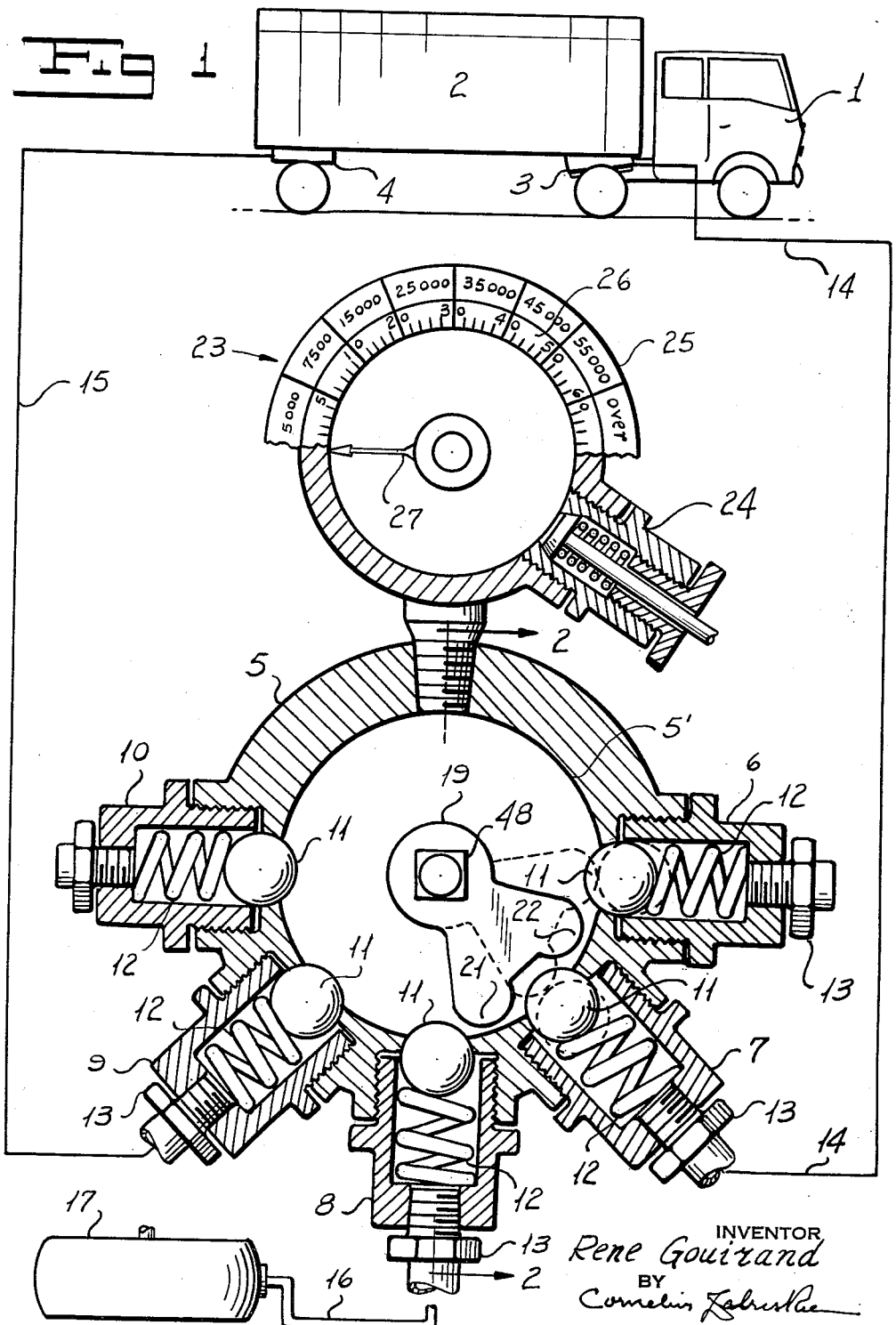
FIG. 1 shows the complete system embodying the present invention and illustrates the control valve mechanism in section, with the indicator shown partially in section and partially in elevation. This figure illustrates the preferred form of the invention.

Referring first to FIG. 1 of the drawings, 1 indicates a tractor and 2 an associated trailer. The rear end of the tractor is provided with a pneumatic suspension chamber, e.g., a pneumatic cushion 3, while the rear end of the trailer also has a pneumatic cushion 4. Preferably mounted in any convenient position on the tractor is a valve housing 5 which is circular. At different points in the circumference of this housing are radial cages 6, 7, 8, 9 and 10. In each of these cages is a ball valve 11 normally impelled in an inward radial direction by a spring 12 to engage with a seat and normally form therewith a seal, with the ball valve projecting radially inwardly from the inner surface 5' of the housing 5. These ball valves constitute the sealing members of the valve mechanisms.

The cages 7, 8 and 9 are provided with pipe couplings 13. The coupling 13 of the cage 7 is connected by a pipe or other suitable duct or conduit 14 to the cushion 3 of the tractor. The coupling 13 of the cage 9 is similarly connected through a duct or conduit 15 with the cushion 4 of the trailer, while the coupling 13 of the cage 8 is connected through a duct or conduit 16 to a pressure tank 17 mounted on the trailer. A sufficient pressure is maintained in this tank to serve maximum requirements of the system. The two cages 6 and 10 vent the interior of housing 5 to the atmosphere. As stated all of the ball valves are normally seated to shut off pressure into the housing 5 and to also seal the cushions 3 and 4.

Arranged coaxially of the housing valve is a spindle 18 which is polygonal to secure to it a valve operating rotor 19 which may be manually rotated within the housing by a handle 20, shown in FIG. 2. This rotor is formed with two knuckles 21 and 22 spaced apart in an arcuate direction the same distance as the arcuate spacing apart of the ball valves 11. This formation permits the rotor in selected positions to straddle any particular ball valve, as shown in full lines in FIG. 1, whereas, when the rotor is moved into the dotted line position, it will then function to simultaneously unseat two adjacent ball valves. Such being the case, the following operations are possible.

If the rotor is moved into a position to engage with the two ball valves of the cages 7 and 8, both of these valves will be unseated and pressure will be fed from the pressure tank into the interior of the housing 5, and thence through the cage 7 and conduit 14 to the cushion 3 of the tractor to introduce air under pressure into this cushion. Similarly, if the rotor is moved to simultaneously engage the ball valves of the cages 8 and 9, pressure will be fed from the tank through the conduit 15 to the cushion 4 of the trailer. If the rotor is moved into a position to simultaneously engage the ball valves of the cages 6 and 7, pressure will be relieved from the cushion 3 to the atmosphere. Similarly, the engagement of the rotor with the ball valves of the cages 9 and 10 will relieve pressure from the cushion 4 of the trailer through the conduit 15 to the atmosphere.

In the manner described, the operator can either add pressure to the respective cushions selectively or relieve such pressures in accordance with the loading of the vehicles.

In order to assist the operator in these operations and so that he will not have to rely solely on his judgment, there is associated with the housing an indicator 23 which is in the main an ordinary pressure indicator of any conventional form, but with additional features. One of these additional features is a pressure relief valve 24 which bleeds off excess pressures which may be admitted into the housing 5, and the other embodies a graduated scale 25 which, in addition to the usual pounds pressure scale 26, indicates corresponding loadings. The usual pointer 27 travels over these scales to indicate the pressures and corresponding loadings.

With the foregoing arrangements, the operator can with a nice degree of accuracy determine the pressures to be employed and can adjust these pressures as may be proper under the conditions.

The structure of FIGS. 3 and 4 operates in exactly the same manner as described in connection with FIGS. 1 and 2, and is connected in exactly the same way with the respective cushions 3 and 4 of the tractor and trailer. However, instead of positioning the ball valves radially of the housing as in FIG. 1, the ball valves are arranged to operate in cages, the axes of which are parallel to the operating spindle. Thus, in these latter figures, the housing 5a has a coaxial spindle 18a with an operating handle 20a. The spindle carries a rotor 19a with knuckles 21a and 22a operable on ball valves 11a mounted in parallel cages, as shown best in FIG. 3.

Both constructions hereinbefore described are relatively simple in construction, require little or no maintenance, and are thoroughly efficient in the performance of their intended functions.

In the constructions which I have chosen to illustrate the invention, the rotor is provided with two knuckles so as to simultaneously unseat two adjacent sealing members. This construction functions very effectively in connection with the tractor and trailer combination as shown in FIG. 1. However, for other uses of the valve mechanism shown, it may be desirable to provide a greater number of sealing members and operate these members through a rotor in any appropriate combination. For this purpose the number of knuckles on the rotor may be increased or diminished. The invention is, therefore, to be understood as fully commensurate with the appended claims.

Having thus fully described the invention, what I claim as new and desire to secure by Letters Patent is:

1. In an assembly of the character described, a housing, a series of normally spring closed ball valves having seats annularly spaced apart from one another about the housing with their axes in a common plane, said valves projecting into the confines of the housing and comprising a pressure inlet valve serving when open to admit pressure into the housing, a pressure feed valve positioned contiguous to and on each side of said inlet valve, and a vent valve positioned contiguous to each of the feed valves and on the side thereof remote from the inlet valve, a manually operable spindle coaxial with the housing, and a rotor mounted on said spindle and having two knuckles annularly spaced apart a distance equal to the spacing of any two adjacent valves to permit said knuckles, through rotation of the rotor, to simultaneously unseal any two adjacent valves and to straddle any one of said valves without operating any of them.

2. A valve mechanism according to claim 1 comprising a pressure controlled safety valve connected to the interior of the housing for releasing pressure within the housing when the same rises above a predetermined maximum.

References Cited in the file of this patent

UNITED STATES PATENTS

| | | |
|---|---|---|
| 1,542,259 | Macy | June 16, 1925 |
| 1,725,280 | Kiefer | Aug. 20, 1929 |
| 1,877,763 | Hazard | Sept. 20, 1932 |
| 1,888,948 | Hazard | Nov. 22, 1932 |
| 2,443,433 | Sanmori | June 15, 1948 |
| 2,495,395 | Tweedale | Jan. 24, 1950 |
| 2,499,318 | Jungerhans | Feb. 28, 1950 |
| 2,505,333 | Mead | Apr. 25, 1950 |
| 2,908,508 | Brunsdon | Oct. 13, 1958 |